Dec. 9, 1930.  E. J. HALL  1,784,006

AIR CONTROL FOR INTERNAL COMBUSTION ENGINES

Filed Feb. 15, 1929  4 Sheets-Sheet 1

INVENTOR
*Elbert J. Hall*
BY
ATTORNEY

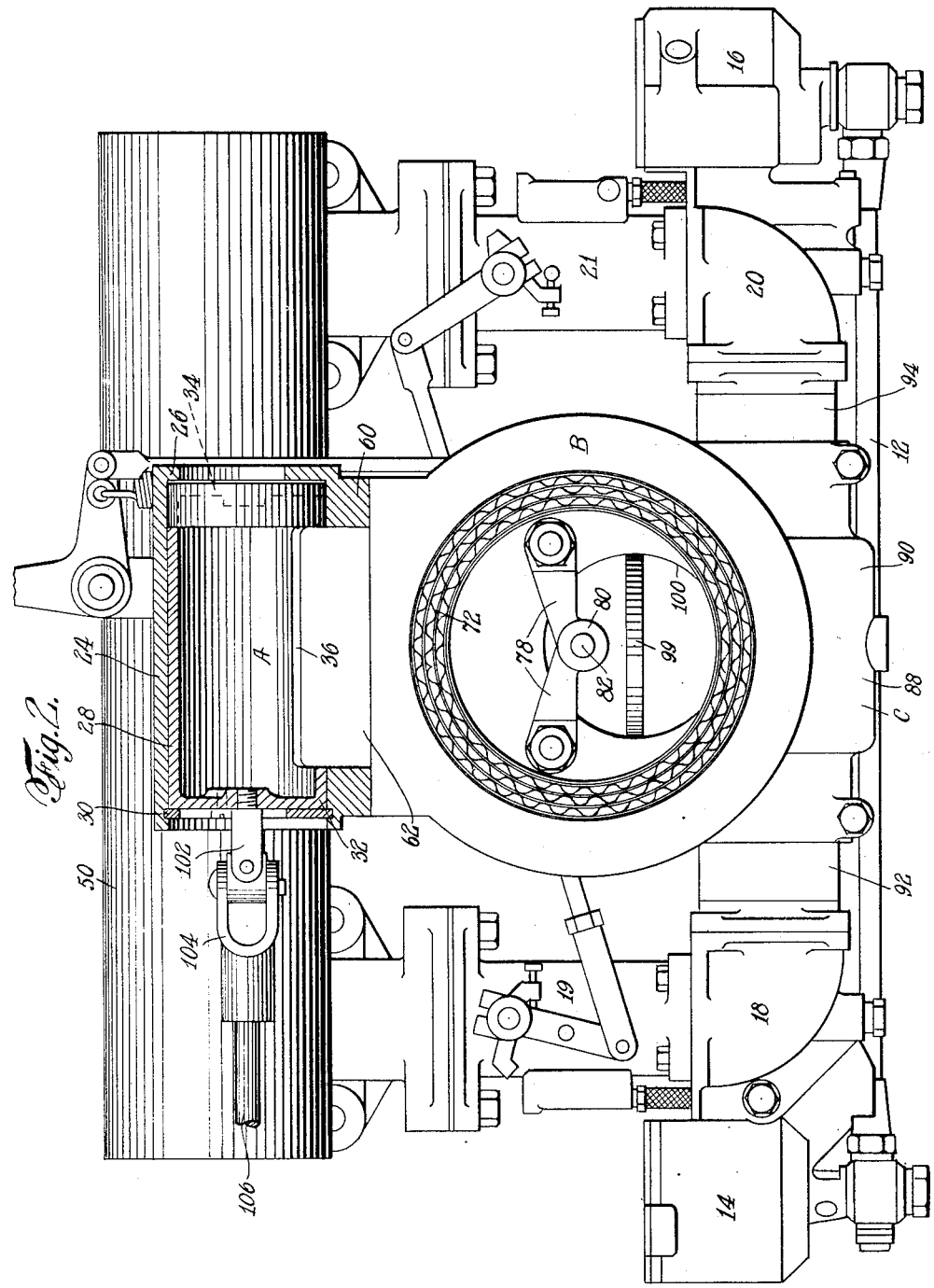

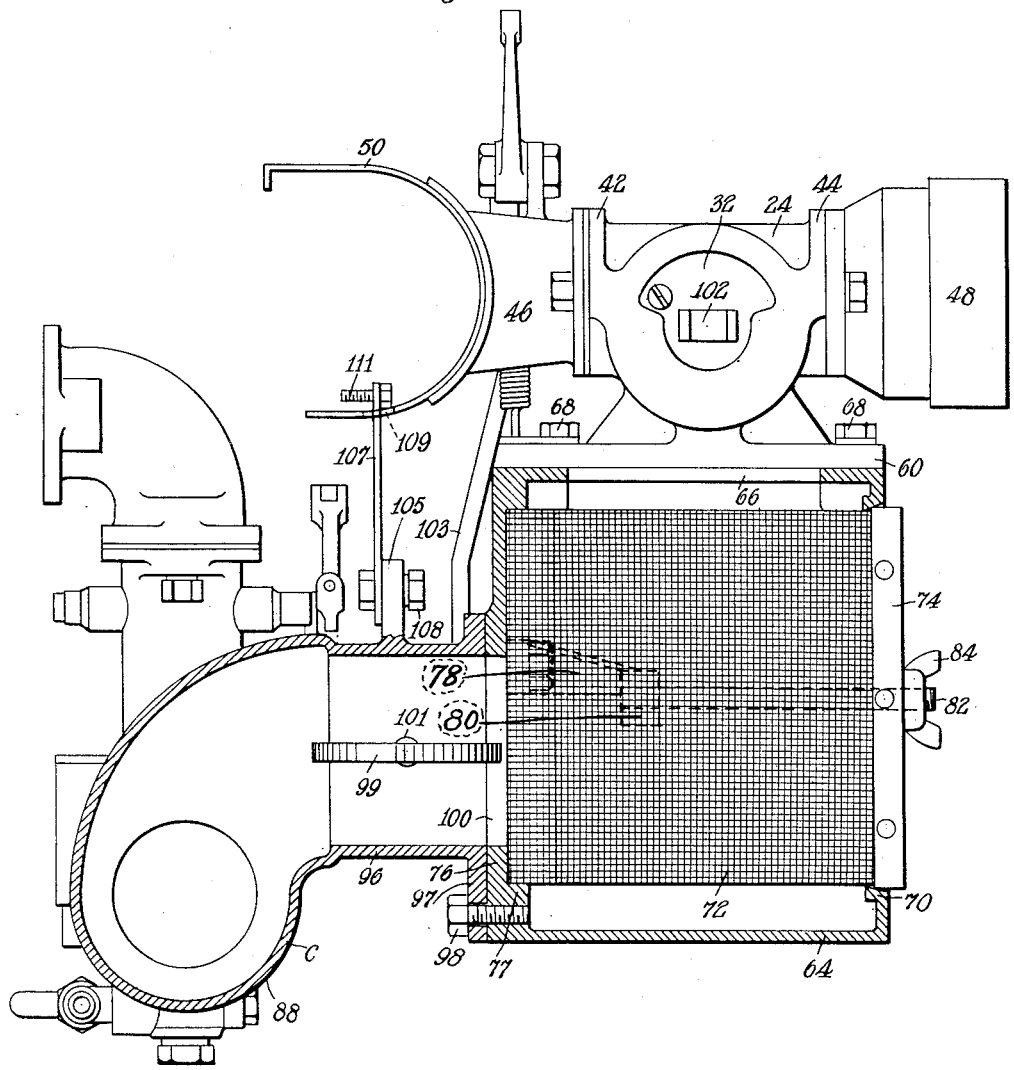
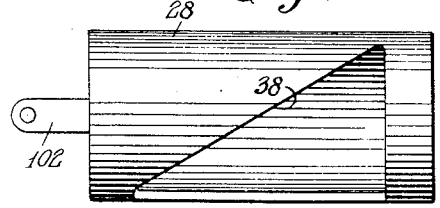

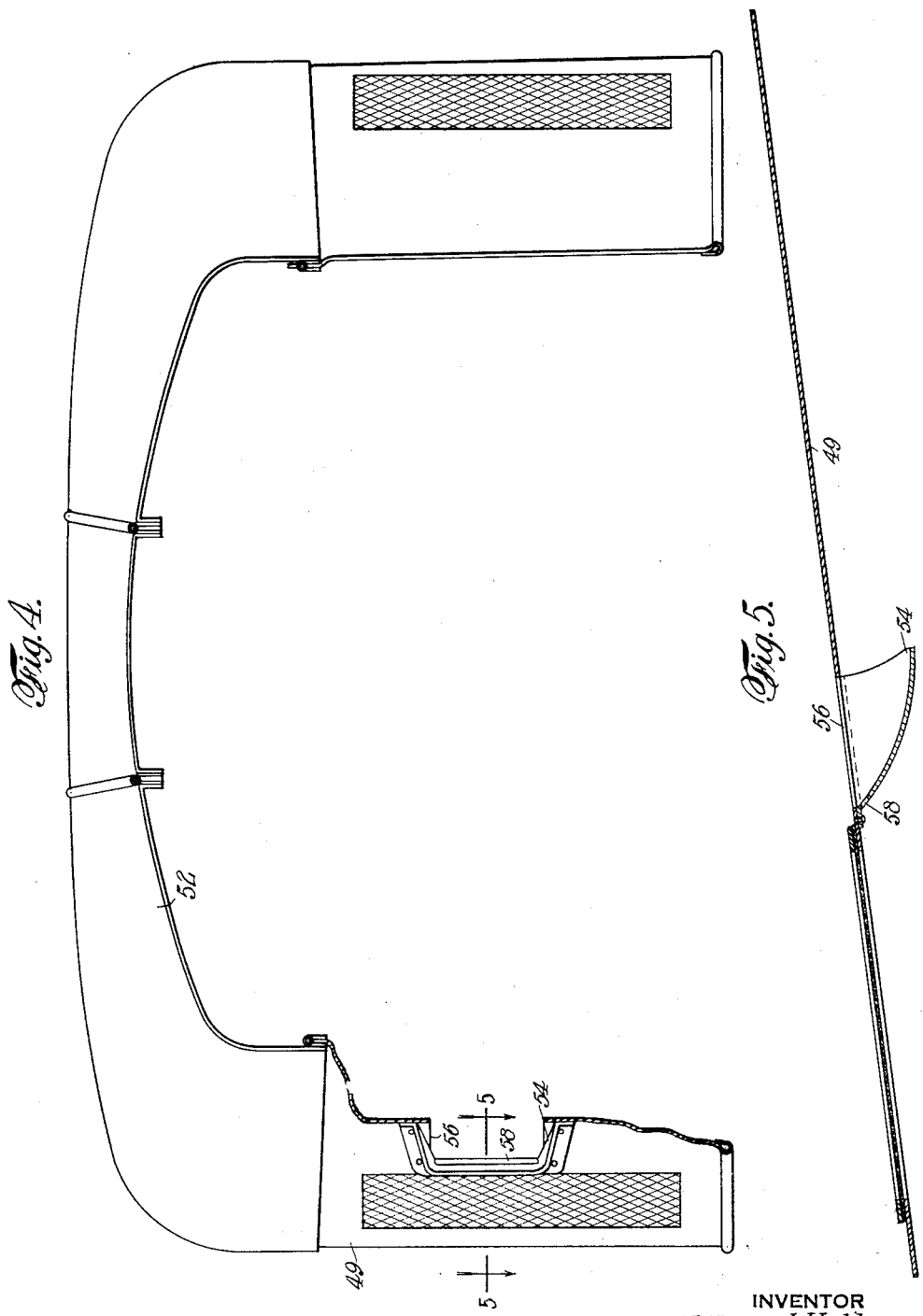

Patented Dec. 9, 1930

1,784,006

UNITED STATES PATENT OFFICE

ELBERT J. HALL, OF BERKELEY, CALIFORNIA, ASSIGNOR TO AMERICAN CAR AND FOUNDRY MOTORS COMPANY, OF NEW YORK, N. Y., A CORPORATION OF DELAWARE

AIR CONTROL FOR INTERNAL-COMBUSTION ENGINES

Application filed February 15, 1929. Serial No. 340,090.

This invention relates generally to internal combustion engines and has specific reference to an air control means for such engines.

One object of this invention is the provision of means for controlling the temperature of the fuel mixture used with internal combustion engines.

Another object of this invention is the provision of a device by which filtered air is delivered to the carburetors of an internal combustion engine.

Still another object of the invention is to provide a device whereby liquid fuels may be easily volatilized and the gaseous products therefrom delivered to an internal combustion engine at predetermined or desired temperatures to afford a better explosive mixture.

A further object of the invention is the provision of an air intake for internal combustion engines by which preheated air or air at atmospheric temperatures is passed through a filter and then delivered to the carburetors of an internal combustion engine.

A still further object of this invention is the provision of a device, such as heretofore mentioned, which is simple and inexpensive to manufacture and which is strong and durable in operation.

A still further object of this invention is the provision of a device for supplying air at identical temperatures and pressures to a plurality of carburetors for an internal combustion engine.

Other objects and advantages of this invention will be apparent from the following description taken with the accompanying drawings which illustrate the preferred embodiment of the invention.

In the drawings,

Fig. 2 is a front elevation of the device with the filter shown in section and showing the valve and valve casing in section;

Fig. 3 is a side elevation of the device, certain parts being shown in section;

Fig. 4 is a front view of the engine hood;

Fig. 5 is a sectional view on the line 5—5, Fig. 4; and

Fig. 6 is a side elevation of a modified form of valve body.

Figure 1:
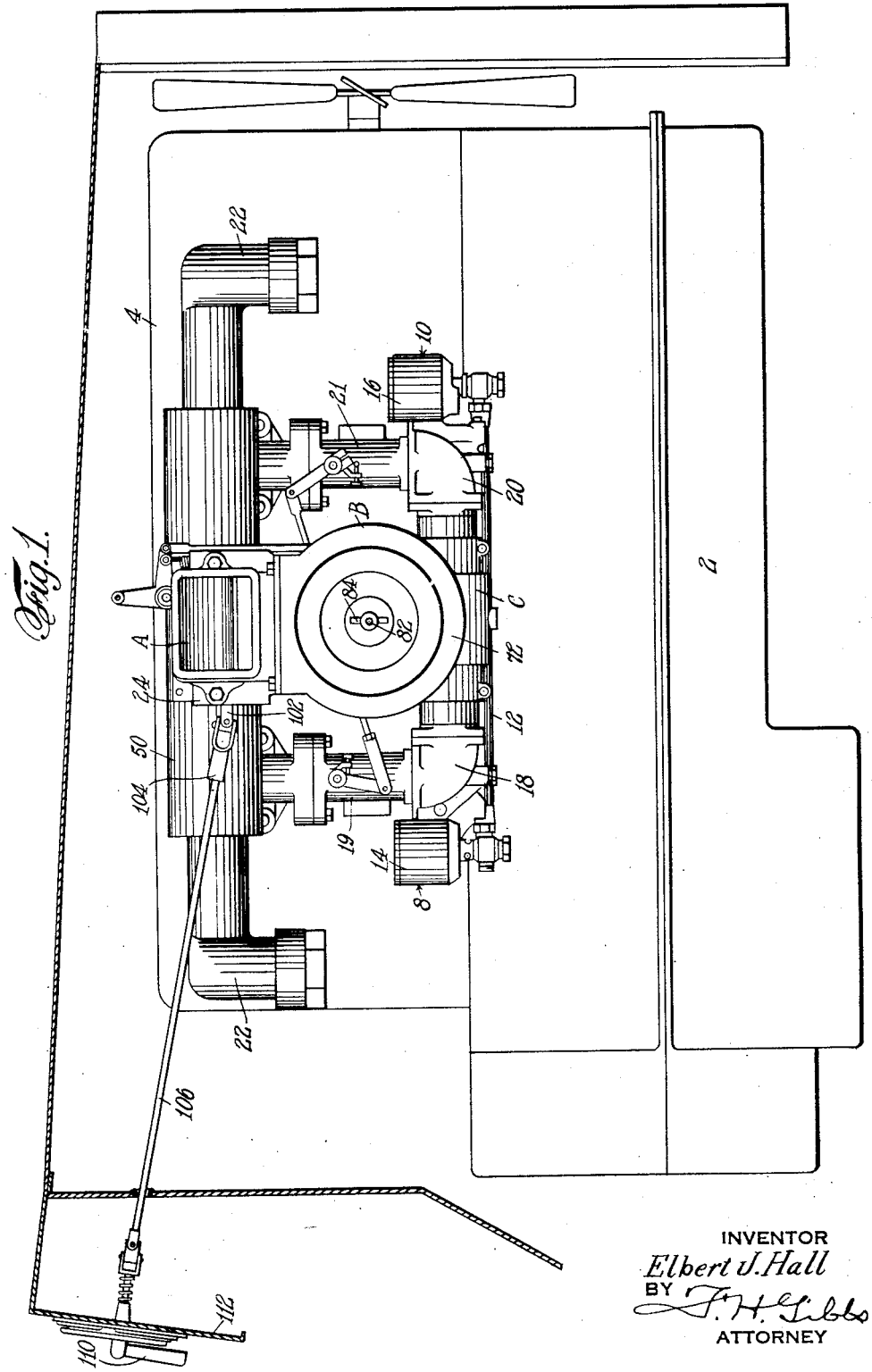
Figure 1 is a side elevation of an internal combustion engine equipped with the device of the present invention.

Referring now more in detail to the drawings in which similar characters of reference designate similar parts in the several views, an internal combustion engine is illustrated more or less diagrammatically in Fig. 1, comprising the crank case 2 and the cylinder block 4. The engine as shown is of the duplex carburetor type, having carburetors 8 and 10, respectively, fed from a common source of fuel supply, not shown, through a feed pipe 12; the carburetors being of conventional construction and including float chambers 14 and 16, respectively, and mixing chambers 18 and 20, respectively, which direct fuel mixture to the intake manifolds of the engine through the uptakes 19 and 21, respectively, the latter having the usual butterfly valves therein actuated by any preferred or desired type of lever arrangement. The engine, in the instance shown, is of the six-cylinder type and is provided with two exhaust pipes 22, each taking care of three cylinders, the exhaust pipes being arranged adjacent the intake manifold.

So far the description is devoted to an arrangement of parts which is more or less conventional, but it has been found desirable to provide a means whereby the air to be mixed with the fuel may be injected or fed to the fuel at varying temperatures, dependent upon operating conditions, and, to that end, the present invention has been designed, the same comprising, broadly, a rotary valve A through which air is led to a filter housing B from which it is directed through a distributor C to be mixed with fuel delivered from the float chambers 14 and 16 of the carburetors to the mixing chambers 18 and 20.

Referring now specifically to the invention, 24 indicates a valve casing which is preferably of the form shown clearly in Figures 2 and 3, being hollow and having open ends and sides, one of said ends being provided with a flange 26 serving as a stop or abutment to position the rotary valve A which is retained against horizontal shifting by a retaining ring 30 seated in a recess in the opposite open end of the casing. The valve A comprises a cylindrical body 28 closed at both ends by heads 32 and 34, respectively, and having an opening 36 formed in the body, said opening being of large size, and in practice it has been found satisfactory to provide the valve body with a substantially rectangular opening of about two-thirds the size of said body, but this is merely illustrative, as obviously the size of the opening may be determined by anyone skilled in the art to meet required conditions. For example, the valve body may be provided with an opening which progressively increases in size as shown at 38 in Fig. 6.

The sides of the valve casing 24 are provided with flanges 42 and 44, respectively, for attachment to air conduits 46 and 48, respectively; conduit 46 having an air heating drum 50 secured thereto which is so formed as to be attached to the exhaust pipe heretofore mentioned, and conduit 48 extending to the side wall 49 of a hood 52, adjacent a scoop 54 riveted or otherwise secured to the wall 49 adjacent an opening 56 formed therein, whereby to receive atmospheric air from the hood to be led through the conduit to the valve casing. During operation of the vehicle equipped with the device of the present invention, it has been found desirable to provide some means for expelling any foreign matter entrained with the air admitted from the scoop into the conduit 48, and, therefore, the scoop is provided with an opening or slot 58 adjacent its rear end through which the foreign matter, which enters the scoop with the air, is permitted to pass to the atmosphere again without entering the conduit 48.

The valve casing is preferably formed with and supported by an attaching base 60 having a central opening 62 therethrough which communicates with the interior of said valve casing and with the interior of a filter housing 64 through an opening 66 formed therein; the filter housing being secured to the base 60 by suitable fasteners such as tap bolts 68.

As clearly shown in the drawings, the filter housing 64 is cylindrical in shape, but this is merely by way of example, and its forward end is provided with an enlarged opening defined by an annular bearing flange 70 and through which opening a filter element 72 may be inserted into the housing 64. In the instance shown, the filter element comprises a screen structure having its forward end closed by a head 74 which is adapted to seat on the bearing flange 70. As can be seen, the filter element comprises a cylindrical structure which is closed at its forward end by the head 74, but is open at its rear end. The rear wall 76 of the housing is provided with an annular flange 77 which serves to position the filter element and also provides a seal for preventing the passage of dirt or other foreign matter out of the housing, as will be obvious. Secured to and extending inwardly from the rear wall 76 of the housing 64 are supporting arms 78 which are formed at their free ends into an integral tapped lug 80. Secured to the head 74 and extending into the interior of the filter element 72 is a screw 82 which is adapted to be engaged in the tapped lug 80; the free end of the screw 82 having a wing nut 84 secured thereto by which the screw 82 may be engaged in the lug 80 and the filter element thus pulled into place in the housing. In this connection, attention is directed to the fact that the flange 70 is tapered whereby to provide a means by which the head 74 may be wedged to position in engagement therewith.

The rear wall 76 of the filter housing is provided with integral tapped lugs 77 which receive bolts 98 for securing a distributor or air horn 88 to the rear wall 76 adjacent an opening 100 formed in the latter. The distributor or air horn 88 comprises a central coupling 90 having oppositely extending branches 92 and 94 connected to the mixing chambers 18 and 20, respectively, of the carburetors; the air horn also includes a feed conduit 96 having an attaching flange 97 through which the aforesaid bolts 98 extend to secure the distributor. Positioned within the conduit 96 is a choke valve 99 pivoted on a shaft 101 the end of which extends outside of the conduit and is connected by a lever, not shown, with an operating rod 103 by which the choke valve may be operated.

Secured to and preferably formed integral with the conduit 96 is an upstanding bracket 105 to which a plate 107 is attached by a suitable fastener such as the bolts 108; the plate 107 extending upwardly through a slot 109 formed in the drum 50 and its upper end is adapted to receive screws 111 which extend into the exhaust pipe for securing the entire device to the engine.

For operating the valve A the head 32 thereof has a yoke 102 secured thereto, which yoke is connected to a clevis 104 carried at the end of an operating rod 106 which extends adjacent the instrument board 112 of the vehicle, the end of said rod 106 being connected to a suitable finger piece 110 arranged on the instrument board, within easy reach of an operator, to be actuated to rotate the rod 106 and hence the valve A.

In the operation of the present invention, an operator will adjust the finger piece 110 to rotate the valve to a desired position such that the passage through the cold air inlet 48 is closed and air from adjacent the exhaust pipe is permitted to pass into the valve casing and the filter housing, and the engine is then started, whereupon air is drawn through the drum 50 and the conduit 46, into the valve casing from where it passes into the filter housing through the screen element 72, and then through feed conduit 96 and the distributor C, and then into the respective carburetors. With the valve A in the position just mentioned, it will be apparent that within a very short time the air, which is directed to the mixing chambers of the carburetors, is preheated and air at atmospheric temperature is excluded. Further manipulation of the finger piece 110 will adjust the valve to receive more or less air at atmospheric temperature through the cold air inlet 48, dependent upon operating conditions, as will be apparent.

It will be obvious from the preceding description that the choke valve 99 is operable to control the pressures in the air distributor, and that regardless of the position of the choke valve, substantially identical pressures will exist in the air inlets of each of the carburetors, thereby avoiding the difficulties which would result from the uneven adjustment of separate choke valves for the carburetors.

From the above description, it is believed that the construction of the device of the present invention will be fully apparent to those skilled in the art, but I desire it understood that the drawings illustrating the invention are merely by way of example, as obviously various changes in the form and proportions of the device may be made within the scope of the appended claims without departing from the spirit of the invention.

What is claimed is:

1. In a motor vehicle, an internal combustion engine, a hood therefor having an opening, a scoop secured to the hood at the opening, and means for admitting air to be mixed with the engine motive fuel comprising a valve casing, a conduit for directing heated air to the casing, a second conduit extending to the scoop for directing air at atmospheric temperature to the casing, a valve in the casing for controlling the passage of air through the conduits to control the temperature of the air admitted thereto, an air delivery conduit for directing air to be mixed with the motive fuel, and filtering means interposed between the valve casing and air delivery conduit.

2. An air control unit for attachment to an internal combustion engine comprising a filter housing having an opening in the top thereof, a filter element removably secured in the housing, an air distributor secured to the housing to receive filtered air therefrom to deliver the same to carburetors, a valve casing, a valve therein, oppositely disposed air conduits connected to the casing, one thereof being adapted to deliver air at atmospheric temperature to the valve casing and the other having a heating drum associated therewith, and a base for supporting said valve casing and to which the filter housing is secured, said base having an opening therethrough for transmitting air from the valve casing to the filter housing.

3. In an internal combustion engine, a pair of carburetors, an intake manifold, an exhaust pipe, and means for supplying filtered air at predetermined temperatures to the carburetors comprising a unit supported by the exhaust pipe and including a filter housing, a filter in said housing, an air distributor connected to the filter housing to receive air therefrom and provided with conduits connected to the carburetors, a choke valve in said distributor, a valve casing supported by the housing, conduits connected to the valve casing to supply heated or air at atmospheric temperature to the valve casing, and a valve in said valve casing for controlling the flow of air through the conduits.

4. In an internal combustion engine, a pair of carburetors, an intake manifold, an exhaust pipe, and means for supplying filtered air to the carburetors at predetermined temperatures comprising an air distributor supported by the exhaust pipe and having conduits connected to the carburetors, a choke valve in said distributor, a filter housing secured to the distributor, a filter element secured in said housing, a valve casing supported by the filter housing, said housing receiving air from the valve casing, conduits connected to said valve casing, one of said conduits being so arranged as to supply air at atmospheric temperature to the valve casing, a heating drum engaging the exhaust pipe and secured to the other conduit for supplying heated air to the valve casing, and a valve in the valve casing for controlling the flow of air through the said conduits.

5. In an internal combustion engine, a carburetor, a hood over the engine provided with an opening, and means for delivering air to the carburetor comprising a filter housing, an air delivery pipe connecting the carburetor and filter housing, and an air conduit connected with the filter housing and having its entrance end arranged at the opening in the hood.

6. In an internal combustion engine, spaced carburetors, an exhaust pipe, and means for delivering heated air to the carburetors comprising a shield arranged over the exhaust pipe, an air conduit having its entrance end connected to the shield to receive air heated by the exhaust pipe in the space between the shield and said pipe, a filter housing receiving the heated air from the conduit, an air distributor supported by the exhaust pipe and connected to the carburetors, and a filter housing arranged between the distributor and air conduit and to which said distributor and air conduit are connected.

7. In an internal combustion engine, a carburetor, an exhaust pipe, and a unit for attachment to the engine for supplying air to the carburetor comprising a filter housing, an air distributor leading from the housing and connected to the carburetor, a valve casing supported by the housing, air conduits leading into the casing to conduct air thereto to be discharged into the filter housing, one of said conduits receiving air at atmospheric temperature and the other conduit receiving air heated by the engine, and a valve in said casing.

8. In an internal combustion engine, a carburetor, and means for supplying filtered air to said carburetor comprising a unit independent of the engine and detachably supported by an engine part, said unit including a filter housing, an air delivery pipe leading from the housing to the carburetor, a valve casing mounted on the filter housing and in communication therewith, a valve in said casing, and oppositely arranged conduits extending from the valve casing, one thereof extending adjacent an engine part which becomes heated when the engine is in operation whereby heated air may pass into said conduit, and the other of which extends in a direction away from the engine whereby to receive unheated air.

9. In an internal combustion engine, a carburetor, a hood over the engine and provided with an opening, and means for supplying filtered air to said carburetor comprising a unit independent of the engine and detachably supported by an engine part, said unit including a filter housing, an air delivery pipe leading from the housing to the carburetor, a valve casing mounted on the filter housing and in communication therewith, a valve in said casing, and conduits extending from the valve casing, one thereof extending adjacent an engine part which becomes heated when the engine is in operation whereby heated air may pass into said conduit, and the other of which extends adjacent the opening in said hood whereby to receive unheated air.

10. In an internal combustion engine, a carburetor, an exhaust pipe, a hood for the engine provided with an opening, and means for delivering air at a predetermined temperature to the carburetor comprising a unit detachably supported by an engine part and including a filter housing, an air delivery pipe connecting the filter housing and carburetor, an air conduit having its entrance end arranged adjacent the exhaust pipe to receive air heated thereby, a second air conduit having its entrance end arranged at the opening in the hood to receive unheated air, a valve casing mounted on and supported by the filter housing and to which the inner ends of the air conduits are connected, and a valve for controlling the admission of air from the conduits to the valve casing.

11. In an internal combustion engine, the combination with the engine body, an intake manifold, an exhaust pipe, and a carburetor connected to the manifold, of means for admitting air to be mixed with the fuel from the carburetor at a predetermined temperature, comprising a unit detachably secured to the engine including a conduit for receiving heated air, a second conduit for receiving air atmospheric temperature, a filter casing, a filter element therein, a valve casing to which the filter casing is detachably secured and to which the conduits are connected, a valve in said valve casing for controlling the admission of air from the conduits to the filter casing, and a delivery conduit for directing filtered air from the filter casing to the carburetor.

12. In an internal combustion engine, a pair of carburetors, means forming air inlets for said carburetors, air heating means, a branched conduit having an inlet at said air heating means, a second air inlet for said conduit constructed and arranged to receive air at atmospheric temperature, said conduit being connected with air inlets of said carburetors, selectively operable means for cutting off the admission of hot or cold air from said conduit, and a common choke valve mounted in said conduit between said selectively operable means and the inlets to said carburetors for simultanenously controlling the depression in the air inlets of said carburetors.

13. In an internal combustion engine, a pair of carburetors, means forming air inlets for said carburetors, air heating means, a branched conduit having an inlet at said air heating means, a second air inlet for said conduit constructed and arranged to receive air at atmospheric temperature, said conduit being connected with the air inlets of said carburetors, means for selectively cutting off the admission of hot or cold air from said conduit, a common choke valve mounted in said conduit between said selectively operable means and the inlets to said carburetors for simultanenously controlling the depression in the air inlets of said carburetors, and an air cleaner mounted in said conduit between said choke and said selectively operable means.

14. In an internal combustion engine having an engine body, exhaust pipe, intake manifold means and a pair of carburetors connected to said manifold means; the combination of a unit for admitting air to both of said carburetors at the same pressure to be mixed with the fuel therein, said unit being readily detachable from the engine and comprising a conduit for receiving heated air, a second conduit for receiving air at atmospheric temperature, a filter casing for receiving air from both of said conduits, a filter element therein, a branched delivery conduit for directing filtered air from the filter casing to the carburetors, and a valve in said unit for simultaneously controlling the pressure of air delivered to said carburetors.

15. In an internal combustion engine having an engine body, exhaust pipe, intake manifold means and a pair of carburetors connected to said manifold means, the combination of a unit for admitting air at identical pressures and temperatures to both of said carburetors to be mixed with the fuel therein, said unit being readily detachable from the engine and comprising a conduit for receiving heated air, a second conduit for receiving air at atmospheric temperature, a filter casing for receiving air from both of said conduits, a filter element therein, a branched delivery conduit for directing filtered air from the filter casing to the carburetors, a valve in said unit for simultaneously controlling the pressure of air delivered to said carburetors, and a second valve in said unit for controlling the admission of heated air and air at atmospheric temperature, said unit delivering air to said carburetors at identical pressures and temperatures.

In witness whereof I have hereunto set my hand.

ELBERT J. HALL.